3,801,714
METHOD OF DEHYDRATING NATURALLY CRISP VEGETABLES AND DEHYDRATED VEGETABLE PRODUCTS

John W. Shipman, Hudson, and Abdul R. Rahman, Natick, Mass., assignors to the United States of America as represented by the Secretary of the Army
No Drawing. Filed Nov. 26, 1971, Ser. No. 202,630
Int. Cl. A23b 7/14, 7/16
U.S. Cl. 426—310                               4 Claims

ABSTRACT OF THE DISCLOSURE

Method of dehydrating a naturally crisp vegetable with retention of crispness after being rehydrated, comprising equilibrating the fresh vegetable with an aqueous solution of glycerol followed by dehydration of the glycerol solution-containing vegetable to a low moisture content, and the dehydrated vegetable product produced by the method.

---

The invention described herein may be manufactured, used, and licensed by or for the Government for governmental purposes without the payment to us of any royalty thereon.

This invention relates to a method of dehydrating a naturally crisp vegetable so that upon being rehydrated, the reconstituted vegetable retains its crispness to a very large degree such that it is quite acceptable for use in salads or for eating with or without cooking as is customary with numerous vegetables and fruits. The invention also relates to the dehydrated vegetable product which is capable of being rehydrated to a condition of crispness closely approximating that of the fresh vegetable.

Fresh celery, tomatoes, cucumbers, and certain other vegetables and fruits in the fresh state are frequently incorporated in salads in combination with mayonnaise or salad dressings, often in combinations with other vegetables and fruits, and sometimes meats or seafoods. These vegetables inthe fresh state are valued as much for their texture as for their flavor, sometimes even more so. The crispness of fresh celery is particularly desired by many people both in salads and as hor d'oeuvres. Firm slices or pieces of fresh cucumbers are frequently used in salads or eaten alone in the raw state or mixed with vinegar and/or spices. Similarly, firm slices or sections of tomatoes are much preferred for salads over mushy tomatoes, tomato paste, tomato sauces, or other soft solid or liquid forms in which tomatoes are prepared for incorporation in foods.

Many attempts have been made to preserve celery for relatively long periods of time while retaining the crisp characteristic of the fresh vegetable. All such efforts have heretofore failed. Since celery, tomatoes, and cucumbers are highly perishable items, it has been very difficult to provide the Armed Forces with salads containing these vegetables which would have the crispness characteristic of the fresh vegetables as normally obtained in civilian life. A method has long been desired for preserving these vegetables, and fruits as well, while retaining the crispness of the fresh product therein so that salads prepared therewith, or the product when eaten alone, will still have the crispness characteristic of the fresh vegtables.

It is, therefore, an object of the invention to provide a method of dehydrating a naturally crisp vegetable with retention of crispness after being rehydrated closely approximating the crispness of the vegetable in the fresh state.

It is a further object to provide vegetables in low moisture-containing forms characterized by their ability to retain crispness and turgidity closely approximating these characteristics in the fresh vegetables upon being rehydrated to substantially the moisture content of the fresh vegetables.

Other objects and advantages will be apparent from the following description of the invention, and the novel features will be particularly pointed out in connection with the appended claims.

It is to be understood that where the term "vegetable" is used throughout the specification and claims, it includes fruit since a fruit is an edible portion of a plant not too different from those edible portions of plants to which the term "vegetable" is commonly applied. The differences between vegetables and fruits are superficial and often a matter of custom or choice. For example, tomatoes and cucumbers are referred to as "vegetables," but might as easily be called "fruits" since they contain the seeds of the plants which produce them.

The invention in general involves the introduction of sufficient glycerol into the cellular structure of fresh crisp vegetables, such as celery, tomatoes, and cucumbers, to protect the cells during subsequent dehydration by whatever method of dehydration may be used, thus retaining in the vegetables after dehydration to a low moisture content, such as from about 2 percent to about 8 percent by weight, the ability to rehydrate and retain thereafter crispness and turgidity which closely approximate these characteristics of the fresh vegetables.

The following examples will more clearly illustrate the practice of the invention:

EXAMPLE 1

Fresh celery stalks were transversely sliced into ¼-inch sections. These sections were divided into equal lots. Five of the lots were soaked in aqueous solutions of glycerol of varying concentrations as shown in the table below, in a ratio by volume of 2:1 for the glycerol solution to the celery, for 18 hours to insure equilibration of the glycerol solutions with the celery in each case. One of these lots of celery sections equilibrated with an aqueous solution of glycerol was freeze-vacuum-dehydrated in accordance with accepted commercial freeze-vacuum-dehydration procedures to less than four percent by weight of moisture. Four of the lots of the celery sections equilibrated with aqueous solutions of glycerol were air dried in a bin drier to less than four percent by weight of moisture, air at 110° F. being blown over the surfaces of the celery sections for 16 hours. One lot of the celery sections was freeze-vacuum-dehydrated in accordance with accepted commercial freeze-vacuum dehydration procedures to less than four percent by weight of moisture without having been treated with aqueous glycerol solution prior to dehydration and one lot of the celery sections was air dried in a bin drier in the same manner as the four lots which had been equilibrated with glycerol solutions, as described above, but without having been treated with aqueous glycerol solution prior to dehydration. A lot of the celery sections was retained without treatment with aqueous glycerol solutions and also without being subjected to dehydration and was subjected to the same test procedure as the lots of celery that were dehydrated with and without the glycerol solution treatment and with and without freeze-vacuum-dehydration and air drying, as may appear. The several lots of dehydrated sections of celery were rehydrated prior to testing thereof by placing each lot in an approximately 10:1 ratio by weight of water to dehydrated celery and allowing it to stand in contact with the water overnight at 40° F. The excess water was then drained from the celery sections and the rehydrated celery was subjected to technological panel testing with respect to texture. The average ratings by the technological panel, as shown in Table 1 below, were based on the "Hedonic Scale," which involves the assignment of ratings from 1 to 9, a rating of 5 representing the borderline of acceptability while the higher the rating, the more acceptable, and the lower the rating, the less acceptable the product texture is insofar as the technological panel members are concerned.

TABLE 1

| Type of dehydration | Glycerol solution treatment (percent glycerol by volume) | Hedonic Scale rating |
| --- | --- | --- |
| None (fresh celery) | None | 7.5 |
| Air dried | None | 4.3 |
| Freeze dried | None | 2.0 |
| Do | 60 | 5.8 |
| Air dried | 20 | 5.9 |
| Do | 40 | 6.1 |
| Do | 60 | 6.1 |
| Do | 80 | 5.9 |

It is apparent that all of the samples subjected to glycerol solution treatment in glycerol solutions of from 20 to 80 percent glycerol by volume prior to dehydration showed good acceptability after rehydration; whereas the samples which were dehydrated without prior treatment with a glycerol solution received poor Hedonic Scale ratings and, therefore, were unacceptable.

EXAMPLE 2

Fresh tomatoes were cut into wedges and a portion of the wedges was equilibrated overnight with a 40 percent by volume solution of glycerol in water and then air dried in a bin to a moisture content of less than 4 percent by weight. The dehydrated tomato wedges were rehydrated in the same manner as the celery slices in Example 1.

Other portions of the tomato wedges were freeze-vacuum-dehydrated and air dried in accordance with accepted commercial freeze-vacuum-dehydration procedures to less than 4 percent by weight moisture contents, then rehydrated in the same manner as the above-described tomato wedges treated with aqueous glycerol solution and air dried.

The above-described rehydrated tomato wedges were subjected to technological panel testing with respect to texture along with wedges of fresh tomato. Table 2 gives the results of these tests using the "Hedonic Scale" as in Example 1.

TABLE 2

| Treatment: | Hedonic Scale rating |
| --- | --- |
| None (fresh tomatoes) | 7.5 |
| Freeze-dried without glyceration | 1.5 |
| Air-dried without glyceration | 2.7 |
| Air-dried after glyceration | 5.4 |

It is apparent that treatment of the tomato wedges with the glycerol solution prior to dehydration resulted in dehydrated tomato wedges which upon being rehydrated were quite acceptable; whereas without the prior treatment with glycerol solution, the dehydrated and rehydrated tomato wedges received a very poor Hedonic Scale rating.

EXAMPLE 3

Small fresh cucumbers were cut into ⅜-inch thick slices which were then cut into wedge-shaped quarters. A portion of these wedge-shaped slice quarters were equilibrated overnight with a 40 percent by volume solution of glycerol in water and then air dried to a moisture content of less than 4 percent by weight over a period of seven hours, one hour being at 170° F., one hour at 150° F., and five hours at 120° F. The dehydrated cucumber wedge-shaped slice quarters were then rehydrated in the same manner as the celery slices in Example 1 and then incorporated in a cucumber and onion salad of conventional formula and organoleptically tested by a technological panel.

Other portions of the wedge-shaped slice quarters of cucumbers were freeze-vacuum-dehydrated and air dried in accordance with accepted commercial freeze-vacuum-dehydration and air drying procedures to less than 4 percent by weight moisture contents, then rehydrated in the same manner as the above-described wedge-shaped slice quarters of cucumbers treated with glycerol solution and air dried.

The above-described rehydrated wedge-shaped slice quarters of cucumbers were incorporated in cucumber and onion salads and subjected to technological panel testing with respect to texture along with wedge-shaped slice quarters of fresh cucumbers also incorporated in cucumber and onion salad of conventional formula. Table 3 gives the results of these tests using the "Hedonic Scale" as in Example 1.

TABLE 3

| Treatment: | Hedonic Scale values |
| --- | --- |
| None (fresh cucumbers) | 7.1 |
| Freeze-dried without glyceration | 3.5 |
| Air-dried without glyceration | 2.9 |
| Air-dried after glyceration | 5.6 |

It is apparent that the treatment of the cucumber wedge-shaped slice quarters with the glycerol solution prior to dehydration resulted in dehydrated cucumber which upon rehydration and incorporation in a cucumber and onion salad was quite aceptable; whereas without the prior treatment with glycerol solution, the dehydrated and rehydrated cucumber produced salad which received a poor Hedonic Scale rating.

It is to be understood that air drying of the glycerol solution containing vegetables may be carried out using air heated above 20° C. to whatever temperature will work best and most efficiently without damaging the vegetable.

While the invention has been described in terms of applying the glycerol-containing solution to fresh vegetables, and while this is the preferred method of carrying out the invention, it is to be understood that a partial dehydration of the vegetable may be carried out prior to equilibration of the vegetable with a glycerol solution. For example, from about 30 to about 65 percent of the original moisture may be removed by air drying of the fresh vegetable prior to treatment of the vegetable with aqueous glycerol followed by dehydration either by air drying of freeze-vacuum-dehydration. When predrying to this extent is carried out prior to infiltration of the vegetable with the glycerol solution, the Hedonic Scale ratings may be slightly less than when the fresh vegetable is treated with glycerol solution, but the reconstituted vegetable products are acceptable.

Although in the examples above equilibration of the vegetable with an aqueous glycerol solution has been described as taking place overnight or over an 18 hour period, it is to be understood that the time required for such equilibration may vary over quite a wide range, e.g., from about 1 hour to about 18 hours or even more. For the shorter times of equilibration it may be necessary to carry out the exposure to the glycerol solution under vacuum, whereas for longer times the equilibration may be carried out at atmospheric pressure.

While the rehydration of the vegetables dehydrated in accordance with the invention has been described in the examples above as being carried out by a single soaking of the dehydrated vegetable in an approximately 10:1 ratio by weight of water to dehydrated vegetable, it is desirable in some cases to change the water two or more times in order to eliminate the glycerol.

While the invention has been described in terms of its application to celery, tomatoes, and cucumbers, largely because these are among the most widely employed vegetables for salads in which retention of crispness is generally considered so essential to the acceptability of salads prepared therewith, it is to be understood that the invention is applicable to other vegetables whenever it is desired to retain the crispness characteristic of the fresh vegetables. For example, the invention may also be applied to radishes, lettuce (especially of the Romaine type), onions, leeks, cabbage, strawberries, raspberries, apples and others. All of these are vegetables or fruits (in common parlance) in which retention of the crispness of the fresh vegetable or fruit is considered desirable under some circumstances, but generally speaking is not so important or essential to acceptability of the food products made therewith as in the cases of celery, tomatoes, and cucumbers, especially in view of the importance of flavor rather than texture in the former cases. Some of these vegetables and fruits as well as many others are readily dehydrated by freeze-vacuum-dehydration or air drying methods to obtain products which rehydrate into satisfactory food products which, even though limp or mushy, are satisfactory for most purposes either because they are usually cooked before being eaten or because even in the uncooked state crispness is not considered essential for acceptability of food products prepared therewith. Application of the present invention is not to be excluded from such vegetables and fruits since in many instances crispness may enhance acceptability. However the additional cost of the glycerol solution as well as the additional costs of the step of equilibration with the glycerol solution in accordance with the present invention will not be economically justifiable in the cases of certain vegetables and fruits.

The method of the present invention has the distinct advantage over other methods of the prior art for preparing dehydrated vegetables, especially celery, tomatoes, and cucumbers, that it makes possible, with relatively small additional cost over conventional air drying or freeze-vacuum-dehydration procedures applied to vegetables, the retention of crispness characteristics substantially similar to such characteristics of the vegetables in their fresh state even after air drying or freeze-vacuum-dehydration and rehydration have taken place. This constitutes a great advantage with respect to celery, tomatoes, and cucumbers, as will be apparent to all persons skilled in the art of dehydrating foods. Thus, the celery, tomato and cucumber products having only from about 2 percent to about 8 percent moisture contents in accordance with the present invention have good stability and also possess a great advantage over all prior known dehydrated celery, tomato, and cucumber products since they retain substantially the crispness characteristics of fresh celery, tomatoes, and cucumbers when they are rehydrated. Every person skilled in preparing or using dehydrated vegetables will recognize the advantages of such dehydrated vegetable products over what has been known and available in the food industry prior to this invention.

We wish it to be understood that we do not desire to be limited to the exact details described, for obvious modifications will occur to a person skilled in the art.

We claim:

1. Method of preserving a naturally crisp vegetable of high moisture content in the fresh state with retention of crispness and acceptability after being dehydrated and subsequently rehydrated closely approximating the crispness and acceptability of said vegetable when consumed in the fresh, uncooked state, consisting of the steps of equilibrating said vegetable in the fresh, uncooked state with an aqueous solution of glycerol, said solution of glycerol comprising from about 20 percent to about 80 percent by volume of glycerol, separating the glycerol solution-containing vegetable from the aqueous solution of glycerol remaining unabsorbed by said vegetable, dehydrating said glycerol solution-containing vegetable to a moisture content of from about 2 percent by weight to about 8 percent by weight, storing the dehydrated glycerol solution-containing vegetable for a period of time substantially up to the time for using said vegetable, and rehydrating without cooking said dehydrated glycerol solution-containing vegetable in a sufficient quantity of water to substantially eliminate the glycerol from the product, said quantity of water being in a weight ratio of at least 10 parts of water to 1 part of dehydrated glycerol solution-containing vegetable, whereby said vegetable is restored to substantially the crispness and acceptability of the vegetable in the fresh, uncooked state.

2. Method according to claim 1, wherein said step of dehydrating and glycerol solution-containing vegetable is carried out by means of air heated above about 20° C. and circulated in contact with said glycerol solution-containing vegetable.

3. Method according to claim 1, wherein said step of dehydrating said glycerol solution-containing vegetable is carried out by freeze-vacuum-dehydration.

4. Method according to claim 1, wherein said vegetable is partially dried to reduce its moisture content by from about 30 percent to about 65 percent of its original moisture content prior to said step of equilibrating said vegetable with said solution of glycerol.

References Cited

UNITED STATES PATENTS

| Number | Date | Inventor | Class |
|---|---|---|---|
| 2,420,517 | 5/1947 | Brandner et al. | 99—204 X |
| 2,473,184 | 6/1949 | Webb | 99—204 |
| 2,509,719 | 5/1950 | Birdsey | 99—204 |
| 3,309,207 | 3/1967 | Tuomy et al. | 99—204 X |
| 3,337,349 | 8/1967 | Savage | 99—204 |
| 3,511,671 | 5/1970 | Miles | 99—204 X |
| 3,535,126 | 10/1970 | Haas | 99—204 X |
| 3,623,893 | 11/1971 | Mauge | 99—204 |

WILBUR L. BASCOMB, JR., Primary Examiner

K. P. VAN WYCK, Assistant Examiner

U.S. Cl. X.R.

426—429, 455